United States Patent [19]

Vanderkooi, Jr. et al.

[11] 3,894,097

[45] July 8, 1975

[54] PROCESS FOR THE PREPARATION OF HEXAFLUOROISOBUTYLENE

[75] Inventors: Nicholas Vanderkooi, Jr., Pompton Plains; Herbert J. Huthwaite, Florham Park, both of N.J.

[73] Assignee: Allied Chemical Corporation, New York, N.Y.

[22] Filed: May 10, 1974

[21] Appl. No.: 468,797

[52] U.S. Cl............................ 260/653.3; 260/343.9
[51] Int. Cl........................ C07c 17/00; C07c 21/18
[58] Field of Search................................. 260/653.3

[56] References Cited
UNITED STATES PATENTS

| | | | |
|---|---|---|---|
| 3,345,420 | 10/1967 | Gilch | 260/653.3 |
| 3,544,591 | 12/1970 | England | 260/653.3 |

Primary Examiner—D. Horwitz
Attorney, Agent, or Firm—Roger H. Criss; Michael S. Jarosz

[57] ABSTRACT

In one embodiment, a process of producing hexafluoroisobutylene is provided which comprises combining a ketene-generating compound with hexafluoroacetone in a reaction chamber maintained at a temperature in the range of about 340° to 1000°C., retaining the reactants in said chamber for a residence time between about 0.1 seconds to 5 minutes whereby hexafluoroisobutylene is formed and thereafter collecting the reaction product.

In a second embodiment, a process of producing hexafluoroisobutylene is provided which comprises heating a ketene-generating compound, optionally together with hexafluoroacetone, in a heating chamber maintained at a temperature in the range of about 340° to 1000°C., retaining said compound in said chamber for a residence time of between about 0.1 to 10 seconds, combining said compound with hexafluoroacetone if the same is not present in said chamber, cooling the resultant mixture to a temperature below about 150°C. to form a liquid and whereby $\beta,\beta$-bis(trifluoromethyl)-$\beta$-propiolactone is formed, heating said lactone in a reaction chamber maintained at a temperature of about 340° to 1000°C. whereby hexafluoroisobutylene is formed and collecting the reaction product.

22 Claims, No Drawings

PROCESS FOR THE PREPARATION OF HEXAFLUOROISOBUTYLENE

FIELD OF THE INVENTION

This invention relates to a process for the production of 3,3,3,-trifluoro-2-trifluoromethyl propene, also known as hexafluoroisobutylene.

DESCRIPTION OF THE PRIOR ART

Hexafluoroisobutylene is useful for a variety of purposes, such as a comonomer used in the production of various copolymers. Among such copolymers is the copolymer with vinylidene fluoride, the preparation of which is described in U.S. Pat. No. 3,706,723 to Chandrasekeran et al., issued Dec. 19, 1972. Hexafluoroisobutylene has been previously prepared by refluxing hexafluoro-2-methyl-2-propanol with phosphorus pentachloride to obtain the desired product as non-condensed overhead product, together with concurrently formed hydrogen chloride which is removed by distillation or scrubbing with alkaline media. Such process has several disadvantages in that the 2-propanol reactant is not a commercially available compound and phosphorus pentachloride is a toxic material. It has also been suggested in the literature (Knunyants et al., Institute of Heteroorganic Compounds, Academy of Sciences of the USSR, 1960, p. 640–646) to prepare hexafluoroisobutylene by pyrolysis of $\beta,\beta$-bistrifluoromethyl-$\beta$-propiolactone at 340°–352°C. In this case, however, the lactone was prepared by reacting in ether at −78°C. perfluoroacetone and ketene over a two hour period, adding phosphoric oxide at room temperature and decanting the solution the following day. A similar technique to prepare the lactone is described in U.S. Pat. No. 3,474,164 to Woolf et al. Such a process is commercially unattractive due to the low temperature, long reaction times and solvent system that are required as well as handling problems with the highly toxic ketene.

SUMMARY OF THE INVENTION

In accordance with a first embodiment of this invention, a process of producing hexafluoroisobutylene is provided which comprises combining a ketene-generating compound (hereinafter defined) with hexafluoroacetone in a reaction chamber maintained at a temperature in the range of about 340° to about 1000°C., retaining the reactants in said chamber for a residence time between about 0.1 seconds to 5 minutes whereby hexafluoroisobutylene is formed and thereafter collecting the reaction product. The reaction is carried out in the vapor phase, preferably at temperatures in the range of about 400° to 700°C. and preferably at residence times in the range of 2 to 40 seconds, more preferably 4–30 seconds.

In accordance with a second embodiment of this invention, a process of producing hexafluoroisobutylene is provided which comprises heating a ketene-generating compound, optionally together with hexafluoroacetone, in a heating chamber maintained at a temperature in the range of about 340° to 1000°C., retaining said compound in said chamber for a residence time of between about 0.1 to 10 seconds, combining said compound with hexafluoroacetone if the same is not present in said chamber, cooling the resultant mixture to a temperature below about 150°C. to form a liquid and whereby $\beta,\beta$-bis(trifluoromethyl)-$\beta$-propiolactone is formed, heating said lactone in a reaction chamber maintained at a temperature of about 340° to 1000°C. whereby hexafluoroisobutylene is formed and collecting the reaction product. Residence times in the reaction chamber may be in the range of about 0.1 to 10 seconds, preferably about 0.5 to 5 seconds. Temperatures in the heating chamber are preferably in the range of about 400° to 700°C.

DESCRIPTION OF THE PREFERRED EMBODIMENTS

In accordance with a preferred embodiment of the first process of this invention, hexafluoroisobutylene is prepared by combining a ketene-generating compound with hexafluoroacetone in a reaction chamber maintained at a temperature in the range of about 340°–1000°C. By the term ketene-generating compound is meant a compound which generates ketene when heated to a temperature in the range of about 340° to 1000°C. Exemplary of such compounds are acetyl-containing organic compounds such as acetic anhydride, acetone, acetic acid, isopropenyl acetate, acetyl acetone and the like, diketene and the like and mixtures of two or more of any such compounds. Preferred ketene-generating compounds include acetic anhydride, acetone and acetic acid. Especially preferred as the starting reactant is acetic anhydride due to the resulting high yield (i.e., substantially quantitative) of the hexafluoroisobutylene product.

Reaction temperatures of at least 340°C. are required to form the desired hexafluorisobutylene products. Although it has been previously suggested (U.S. Pat. No. 3,271,419 to Linn, for example) to react acetic anhydride and hexafluoroacetone, the reaction temperature was 200°C. for 10 hours and the resultant product was 3-(trifluoromethyl)-4,4,4-trifluorocrotonic acid. Although temperatures above 1000°C. may be employed in the process of this invention, they are neither required nor desired due to increased energy costs and the possibility of producing carbon or other products which may plug the reaction chamber.

Preferred reaction chamber temperatures are generally in the range of about 400° to 900°C. When acetic anhydride is employed as a starting reactant, the temperature in the reaction chamber is preferably in the range of about 400° to 700°C., more preferably in the range of about 450° to 575°C. Below about 400°C., yield of hexafluoroisobutylene decreases rapidly whereas above about 700°C., carbon may form along with methane and carbon monoxide which are noncondensibles and are difficult to separate from the hexafluorisobutylene product. When acetic acid or acetone is employed as a starting reactant, preferred temperatures are in the range of about 550° to 1000°C., more preferably about 550° to 700°C. since in these ranges the conversion to hexafluoroisobutylene is high and the conversion to undesirable by-products is low. Again, the upper temperature limit is dictated by energy requirements as well as carbon formation.

As the reaction chamber, there can be employed any conventional reaction apparatus, such as a tube, vessel, etc. Since the reactions occur in the gas phase, a reaction tube has proven quite acceptable as the reaction chamber. The reaction tube or similar chamber may be formed of any conventional material capable of withstanding the reaction temperatures. These materials include metals such as copper and stainless steel, quartz, glass, heat-resistant glass, etc. It is not desireable, however, to employ reaction chambers formed of 316 stainless steel when the chamber is to be heated to temperatures above about 550°C. since such material tends to catalyze reactions which form methane, carbon monoxide and carbon rather than the desired product. The size of the reaction tube or vessel is dictated by the desired residence time, flow rates, etc. For example, the diameter of the reaction tube may range from about one-fourth to 4 inches with lengths in the range of 1 to 10 feet.

It is generally preferred that the residence time in the reaction chamber be as short as possible for any desired degree of conversion. Residence times in the reaction chamber are in the range of about 0.1 seconds to 5 minutes, preferably about 2 to 40 seconds and more preferably about 4 to 30 seconds. We have determined that in general, as the temperature of the reaction tube increases, the residence time in the tube required for a particular conversion decreases, and that the relationship is essentially linear.

The mol ratio of reactants is not critical; preferably, however, at least about 0.5 mol of the ketene-generating compound should be present for each mol of hexafluoroacetone. When employing diketene as reactant, at least about 0.5 mols of diketene per mole of hexafluoroacetone should be present. The mol ratios may, for example, be in the range of about 0.5:1 to about 4:1 or higher of the ketene-generating compound to hexafluoroacetone.

Since the ketene-generating compounds generally are liquids at room temperature, such as acetic anhydride, acetic acid and acetone, it is desirable to preheat the same to volatilization temperatures in order to reduce the residence time in the reaction chamber. For this purpose, such reactants may be preheated in a chamber maintained at a suitable temperature, such as in the range of about 150° to 300°C. although lower or higher temperatures may be employed depending upon the specific reactant. Hexafluoroacetone, being a gas at room temperature, need not be preheated although it may be desired to introduce both the acetic anhydride or other liquid reactant and the hexafluoroacetone through a preheater. In some cases it may be desirable to dilute the gaseous feed into the reaction tube with a non-reactive carrier gas. Gases such as the inert gases such as helium as well as nitrogen, carbon dioxide, etc., may be employed as the carrier gas. The pressure of the gases in the furnace is not critical and may be above or below atmospheric pressure.

In one specific embodiment of this invention, the gaseous reactants are introduced into a reaction tube which is surrounded by a ceramic tube furnace including wire heaters in order to maintain the desired reaction chamber temperature. The particular type of heating means or furnace is not critical and any conventional means may be employed.

The reaction products exiting the reaction chamber include hexafluoroisobutylene, acetic acid and carbon dioxide as well as minor amounts of hexafluoroacetone and $\beta,\beta$-bis(trifluoromethyl)-$\beta$-propiolactone, when the ketene-generating compouns is acetic anhydride. When acetone is the starting reactant, methane rather than acetic acid is formed and when acetic acid is the reactant, water is formed as a by-product. Hexafluoroisobutylene may be separated from the reaction product mixture by conventional scrubbing, drying and condensing techniques. For example, the reaction product mixture may be first scrubbed with water to remove the acetic acid and then with a caustic solution (e.g. an aqueous NaOH solution) to remove carbon dioxide. Alternatively, the order of the scrubbing steps may be reversed or the water scrubbing eliminated. The aqueous solution of reaction products may then be introduced into a drying column or the like to remove the water and then to a condenser to collect hexafluorisobutylene liquid.

The above-described reaction process produces hexafluoroisobutylene in high yields. Yields on the order of 20 to 100% have been obtained. Moreover, the present process utilizes commercially available, relatively, non-toxic starting materials, requires no solvents and is conducted in the gaseous phase with very short reaction times.

In accordance with the second embodiment of a process of this invention as described above, hexafluoroisobutylene is produced by heating a ketene-generating compound, optionally together with hexafluoroacetone, in a heating chamber maintained at a temperature in the range of about 340° to 1000°C., combining the ketene-generating compound gas with hexafluoroacetone if the latter is not present in the heating chamber, cooling the reaction product mixture to below about 150°C. to liquefy the same whereby $\beta,\beta$-bis(trifluoromethyl)-$\beta$-propiolactone is formed, heating the lactone in a reaction chamber maintained at a temperature in the range of about 340° to 1000°C. whereby hexafluoroisobutylene is formed and collecting the reaction product. It has been found that although this embodiment requires two heating steps, the total residence time in the reaction chambers is less than in the above-described process since the reaction to produce the lactone is much faster in the liquid phase than is the reaction to produce hexafluoroisobutylene from the reactants of the above-described process. Moreover, the residence time to pyrolyze the lactone to the desired hexafluoroisobutylene is also very short.

In this embodiment, the ketene-generating compound is introduced into a heating chamber which may be the same as the reaction chamber previously described with respect to the first embodiment. The heating chamber may comprise a reaction tube of the materials described above and is heated by means of a tube furnace, as previously described, or the like. The ketene-generating compound is preferably in the form of a gas for maximum efficiency although of course this reactant may be introduced into the heating chamber as a liquid and volatized therein. This would, however, necessitate increased residence times. Along with this gaseous reactant, hexafluoroacetone may also be introduced into the heating chamber; alternatively, the hexafluoroacetone may be admixed with the stream exiting the heating chamber. As with the previously described process, a carrier gas may be employed as a diluent together with the ketene-generating compound gas (the "reactant gas") and optionally the hexafluoroacetone.

The heating chamber is heated to a temperature in the range of about 340° to 1000°C.; preferred temperature ranges are similar to those specified in the first process. The gas is retained in the heating chamber for a residence time in the range of 0.1 to 10 seconds, preferably 0.5 to 5 seconds. In many cases, the residence time may be very short, in the order of 1 second or less. Mol ratios of the reactants may be similar to those described in the first process and preferably are in the range of 0.5 to 4:1 or higher of the ketene-generating compound to hexafluoroacetone. In the heating chamber, it is believed that the ketene-generating compound breaks down to yield ketene and other compounds.

As stated above, if the hexafluoroacetone is not introduced into the heating chamber, it is combined with the reactant gas after the latter exits the heating chamber. The resultant stream is cooled to a temperature below about 150°C., in order to form a liquid phase. Conventional cooling apparatus may be employed for this purpose; exemplary of such apparatus include heat exchangers. It has been found that the lactone is produced very rapidly in the liquid phase, which is predominately acetic acid. The resultant product mixture may be retained in a liquid phase for subsequent use in carrying out the second step of this process or it may be directly employed in the production of hexafluoroisobutylene (i.e., in a continuous process). In the latter case, the liquid product mixture may typically be held in a holding chamber maintained at a temperature below about 150°C. for a residence time in the range of up to several hours.

The liquid reaction product mixture of the first step, containing the lactone, is next heated in a reaction chamber to yield hexafluoroisobutylene. Prior to introduction into the reaction chamber, the liquid mixture may optionally be preheated in a suitable heating chamber to a temperature of about 150° to 250°C. in order to volatilize the mixture so that the residence time in the reaction chamber may be reduced. The reaction chamber employed for the second step of this process may be a reaction tube, vessel, etc. as described with respect to the heating chamber and may be formed of similar materials. The reaction chamber is heated by suitable means, also as previously described, to a temperature in the range of about 340° to 1000°C., preferably about 400° to 700°C. and more preferably about 400° to 575°C. Residence times in the reaction chamber are preferably in the range of about 0.1 to 10 seconds, more preferably 0.5 to 5 seconds. In the reaction chamber, β,β-bis(trifluoromethyl)-β-propiolactone is pyrolyzed to hexafluoroisobutylene, carbon dioxide as well as other by-products. Hexafluoroisobutylene may be separated from this reaction product mixture by the same techniques utilized in the first described process, viz., caustic scrubbing, water scrubbing, drying and condensing.

The percent yields of hexafluoroisobutylene via this two-step process are also high, in the order of 20 to 95%, although they are generally somewhat lower than in the first process because it is believed that certain side reactions which occur are reversible.

A separate reaction chamber need not be employed to pyrolyze the lactone to hexafluoroisobutylene as the reaction tube or the like could pass through the same heating means used in the first step of the process two or more times. That is, for example, a reaction tube may be utilized which has a first section comprising the heating chamber, that is heated by a tube furnace or other means, an area outside of the heated area which is cooled to form the liquid phase referred to previously and a second section, the reaction chamber, which is connected to the first section by a bend or the like and which also is within the heated area. Hence, a multipass reaction chamber may be employed wherein the reactants are passed a plurality of times through a single heated zone.

To further illustrate the present invention, the following non-limiting examples are given.

EXAMPLE 1

Acetic anhydride (Ac$_2$O) was vaporized in a heated ¼ inch I.D. copper tube maintained at 200°C. Hexafluoroacetone (6FK) vapors were introduced into the acetic anhydride vapor stream and the combined stream was fed into a ½ inch I.D. copper tube reaction chamber of 12 inches in length to a desired temperature by means of a 1 × 12 inch ceramic tube furnace electrically heated by a nichrome wire. The combined vapor feed was maintained in the heated copper tube for a desired residence time by adjusting the flow rate into the tube. The exit gases were collected and analyzed by gas chromatography to detect hexafluoroisobutylene (HFIB) and other gases. The results are reported in Table I.

Table I

| Sample | Furnace Temperature (°C) | Ac$_2$O Vapor Feed (ml/min) | 6FK Vapor Feed (ml/min) | Residence time (sec) | HFIB Mole % Conversion |
|---|---|---|---|---|---|
| 1 | 535 | 426 | 70 | 1.2 | 25 |
| 2 | 535 | 45 | 22 | 8.5 | 76 |
| 3 | 535 | 25 | 8 | 17.4 | 100 |
| 4 | 535 | 17 | 15 | 18 | 97 |
| 5 | 425 | 25 | 8 | 20.1 | 39.9 |
| 6 | 450 | 25 | 8 | 19.5 | 54.9 |
| 7 | 485 | 25 | 8 | 18.6 | 74.7 |
| 8 | 505 | 25 | 8 | 18.1 | 80.8 |
| 9 | 555 | 25 | 8 | 17.1 | 100 |
| 10 | 440 | | | 18.6 | 50 |
| 11 | 514 | | | 8.6 | 50 |
| 12 | 566 | | | 3.6 | 50 |
| 13 | 500 | | | 17.4 | 80 |
| 14 | 535 | | | 13 | 80 |
| 15 | 580 | | | 6.4 | 80 |
| 16 | 600 | | | 4.6 | 80 |

EXAMPLE 2

Example 1 was repeated except that acetone was employed instead of acetic anhydride. The results are shown in Table II.

Table II

| Sample | Furnace Temperature (°C) | Acetone Vapor Feed (ml/min) | 6FK Vapor Feed (ml/min) | Residence Time (sec) | HFIB Mole % Conversion |
|---|---|---|---|---|---|
| 1 | 590 | 14 | 12 | 21 | 70 |
| 2 | 630 | 14 | 9 | 23 | 92 |
| 3 | 600 | 34 | 15 | 10 | 43 |
| 4 | 680 | 34 | 15 | 9 | 86 |

EXAMPLE 3

Acetic anhydride was vaporized in a heated ¼ inch copper tube maintained at 200°C. Hexafluoroacetone vapors were introduced into the acetic anhydride vapor stream and the combined stream was fed into a ¼ inch I.D. copper tube heating chamber of 12 inches in length heated to a desired temperature by means of a 1 × 12 inch ceramic tube furnace heated by means of a nichrome wire. The exit stream from the heating chamber was cooled in an air cooled ¼ inch I.D. copper tube to 70°C which resulted in formation of a liquid which was collected. The cooled product stream was analyzed by gas chromatography and included β,β-bis-(trifluoromethyl)-β-propiolactone and small amounts of hexafluoroisobutylene. The results are shown in Table III.

Table III

| Sample | Furnace Temp (°C) | Ac₂O Vapor Feed (ml/min) | 6FK Vapor Feed (ml/min) | Residence Time (sec) | Lactone Mole % Conversion | HFIB Mole % Conversion |
| --- | --- | --- | --- | --- | --- | --- |
| 1 | 530 | 177 | 100 | 0.35 | 60 | 4 |
| 2 | 550 | 177 | 100 | 0.35 | 75 | 6 |

A separate product mixture prepared in the above manner was fed as a liquid containing the lactone (33 weight percent), acetic acid and other by-products to a 500 ml. round bottom Pyrex flask heated by a heating mantel to a desired temperature. The resultant gas product stream was identified by gas chromatography as including hexafluoroisobutylene. The results are reported in Table IV.

Table IV

| Flask Temperature (°C) | Residence Time (sec) | HFIB Mole % Conversion |
| --- | --- | --- |
| 405 | 3 | 50 |
| 475 | 3 | 91 |
| 510 | 3 | 95 |

EXAMPLE 4

Example 1 is repeated utilizing acetic acid as the ketene-generating compound. Similar results are obtained.

EXAMPLE 5

Example 1 is repeated utilizing diketene as the ketene-generating compound. Similar results are obtained.

EXAMPLE 6

Example 1 is repeated and the product gas stream is fed to a water scrubber wherein it is scrubbed with water at ambient temperature. The gas stream is then fed to a caustic scrubber wherein it is scrubbed with a 5% aqueous NaOH solution and is thereafter condensed in a dry ice bath at −70°C to hexafluoroisobutylene liquid.

As can be seen, the process of this invention provides a method of preparing hexafluorobutylene at high temperatures and short reaction times and without the need for a solvent or special handling procedures which are attendant with ketene. The hexafluoroisobutylene so prepared is useful for a variety of purposes. For example, it may be used as a comonomer in the production of the copolymer with vinylidene fluoride.

It is to be understood that variations and modifications of the present invention may be made without departing from the scope of the invention. It is also to be understood that the scope of the invention is not to be interpreted as limited to the specific embodiments disclosed herein, but only in accordance with the appended claims when read in the light of the foregoing disclosure.

We claim:

1. A process of producing hexafluoroisobutylene comprising combining a compound selected from the group consisting of acetic anhydride, acetone, acetic acid, isopropenyl acetate, acetyl acetone, diketene and mixtures thereof, with hexafluoroacetone in a reaction chamber maintained at a temperature in the range of about 340° to about 1000°C., retaining the reactants in said chamber for a residence time between about 0.1 seconds to 5 minutes whereby hexafluoroisobutylene is formed and collecting the reaction product.

2. The process of claim 1 wherein said compound is diketene compound.

3. The process of claim 1 wherein said compound is selected from the group consisting of acetic anhydride, acetic acid and acetone and mixtures thereof.

4. The process of claim 3 wherein said compound is acetic anhydride.

5. The process of claim 4 wherein said temperature is in the range of about 400° to 700°C.

6. The process of claim 3 wherein said temperature is in the range of about 550° to 1000°C.

7. The process of claim 1 wherein said residence time is in the range of about 2 to 40 seconds.

8. The process of claim 1 wherein the mole feed ratio of said compound to said hexafluoroacetone is in the range of about 0.5:1 to 4:1.

9. The process of claim 1 including separating said hexafluoroisobutylene from the reaction product by scrubbing the reaction product with an aqueous caustic solution, drying the scrubbed product to remove water and condensing the evaporated product whereby hexafluoroisobutylene is obtained.

10. The process of claim 1 including volatilizing said compound prior to combination with hexafluoroacetone gas in said reaction chamber.

11. A process of producing hexafluoroisobutylene comprising heating a compound selected from the group consisting of acetic anhydride, acetone, acetic acid, isopropenyl acetate, acetyl acetone, diketene and mixtures thereof and mixtures with hexafluoroacetone, in a heating chamber maintained at a temperature in the range of about 340° to 1000°C., retaining said compound in said chamber for a residence time between about 0.1 to 10 seconds, combining said compound with hexafluoroacetone if the same is not present in said chamber, cooling the resultant mixture to a temperature below about 150°C. to liquefy said mixture and whereby β,β-bis(trifluoromethyl)-β-propiolactone is formed, heating said lactone in a reaction chamber maintained at a temperature of about 340° to 1000°C. whereby hexafluoroisobutylene is formed and collecting the reaction product.

12. The process of claim 11 wherein said compound is diketene compound.

13. The process of claim 11 wherein said compound is selected from the group consisting of acetic anhydride, acetic acid and acetone and mixtures thereof.

14. The process of claim 13, wherein said compound is acetic anhydride.

15. The process of claim 14 wherein said temperature in said heating chamber is in the range of about 400° to 700°C.

16. The process of claim 13 wherein said temperature in said heating chamber is in the range of about 550° to 1000°C.

17. The process of claim 11 wherein said reaction chamber is maintained at a temperature in the range of about 400° to 700°C.

18. The process of claim 11 wherein the residence time in said reaction chamber is in the range of about 0.1 to 10 seconds.

19. The process of claim 11 wherein said heating chamber and said reaction chamber comprise a single tube maintained at the desired temperature by means of a single heating source and a portion of said tube outside of said heating source is maintained at a temperature below about 150°C. to form said liquid phase.

20. The process of claim 11 including separating said hexafluoroisobutylene from the reaction product by scrubbing the reaction product with an aqueous caustic solution, drying the scrubbed product to remove water and condensing the evaporated product whereby hexafluorisobutylene is obtained.

21. The process of claim 11 wherein the molar feed ratio of said compound to hexafluoroacetone is in the range of about 0.5:1 to 4:1.

22. The process of claim 11 including volatilizing said compound prior to combination with hexafluoroacetone gas in said heating chamber.

* * * * *

UNITED STATES PATENT AND TRADEMARK OFFICE
CERTIFICATE OF CORRECTION

PATENT NO. : 3,894,097
DATED : July 8, 1975
INVENTOR(S) : Nicholas Vanderkooi, Jr. and Herbert J. Huthwaite It is certified that error appears in the above-identified patent and that said Letters Patent are hereby corrected as shown below:

Col. 8, line 13, "compound" should be deleted after -- diketene --.

Col. 8, line 56 "compound" should be deleted after -- diketene --.

Signed and Sealed this sixteenth Day of September 1975

[SEAL]

Attest:

RUTH C. MASON
Attesting Officer

C. MARSHALL DANN
Commissioner of Patents and Trademarks